United States Patent [19]

Amacker

[11] Patent Number: 4,969,538
[45] Date of Patent: Nov. 13, 1990

[54] TREE CLIMBING STAND

[76] Inventor: Joseph A. Amacker, 1212 Main St., Delhi, La. 71232

[21] Appl. No.: 336,793

[22] Filed: Apr. 12, 1989

[51] Int. Cl.⁵ ............................................. A47C 9/10
[52] U.S. Cl. ................................... 182/187; 182/133
[58] Field of Search ............... 182/187, 188, 152, 133, 182/134–136; 248/318.4

[56] References Cited

U.S. PATENT DOCUMENTS

| | | | |
|---|---|---|---|
| 2,957,187 | 10/1960 | Raia | 248/188.5 |
| 4,129,198 | 12/1978 | Hunter | 182/187 |
| 4,137,995 | 2/1979 | Fonte | 182/187 X |
| 4,331,216 | 5/1982 | Amacker | 182/187 X |
| 4,337,844 | 7/1982 | Hice, Sr. | 182/133 X |
| 4,409,907 | 10/1983 | Norton | 182/187 X |
| 4,452,338 | 6/1984 | Untz | 182/187 |
| 4,726,447 | 2/1988 | Gibson et al. | 182/187 X |
| 4,730,700 | 3/1988 | Miller et al. | 182/187 |

Primary Examiner—Karen J. Chotkowski
Attorney, Agent, or Firm—Wigman & Cohen

[57] ABSTRACT

A tree climbing stand utilizing two climbing elements. Also provided is a spring actuated mechanism for locking the tree stand in its expanded, operational position, a retractable safety bar for supporting the back of the climber, and a readily removable cleat, which may be included or excluded at the discretion of the user, for engaging the tree.

24 Claims, 2 Drawing Sheets

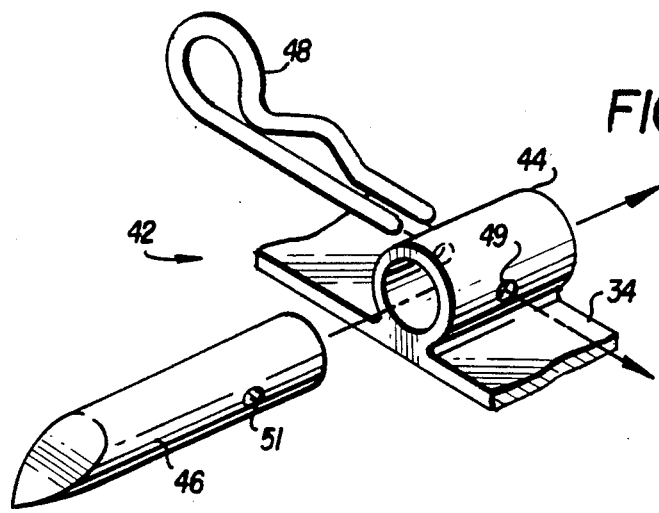
FIG. 4
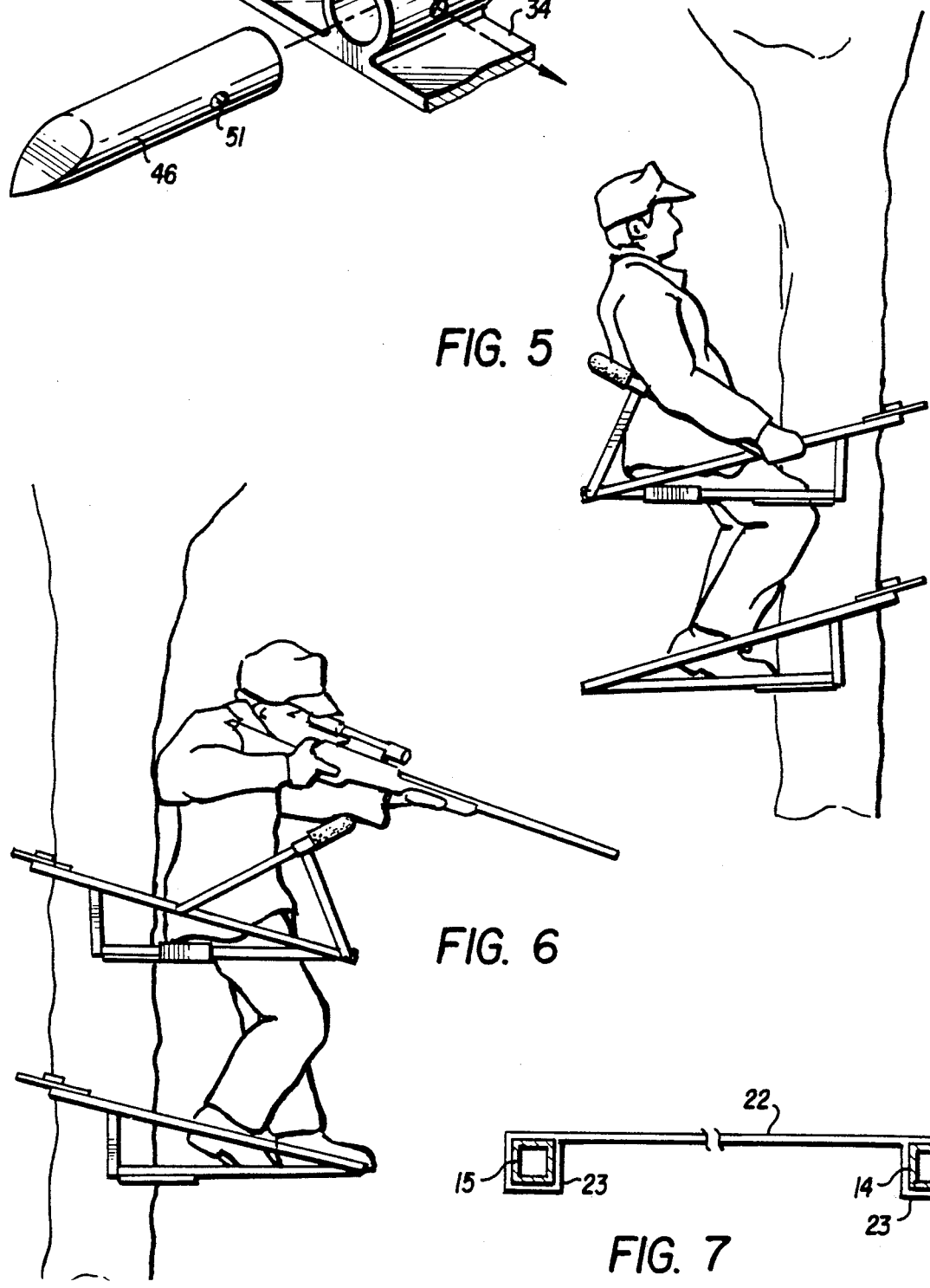
FIG. 5
FIG. 6
FIG. 7

TREE CLIMBING STAND

BACKGROUND OF THE INVENTION

1. Field of the Invention

The present invention relates to pole grasping-type climbers utilizing alternate grasping structures and, more particularly, to stands formed of two climbing members which are alternately raised by the user to attain a desired elevation in a tree, or on a pole or the like.

2. Description of the Prior Art

The present invention is an improvement over my climbing stand, U.S. Pat. No. 4,331,216 (hereinafter the '216 patent). This earlier device, like the prior art in general, has several features in need of improvement.

First, referring to the '216 patent, in order to move the seat 5 from the forward to rearward positions shown in FIGS. 1 and 6 respectively, the platform must be disengaged from bar means 33 and 34. Moving the platform in such a manner has been found to be cumbersome and awkward for the user, especially when done while elevated in the tree.

A second limitation of the '216 patent and the prior art in general is the fact that cleats 6 and 18 cannot be easily removed to enable the stand to be used legally in jurisdictions which proscribe the use of cleats.

A third shortcoming of the '216 patent and the prior art in general is the lack of a structure upon which the user may rest his back while climbing in the manner illustrated in FIGS. 4 and 5 of the '216 patent.

A fourth limitation of the '216 patent is the lack of means for securing telescoping members 13, 43, and 27 within side support bars 33, 34, 28 and 48 when the stand is in its operating position as shown in FIG. 1. This lack of locking means allows the climbing stand to collapse during the climbing operation thereby causing injury to the user.

Therefore, the primary drawbacks of the prior art are the difficulty in moving the seat, the inability of removing the cleats, the lack of support upon which the user can rest his back while climbing and the absence of means for locking the telescoping elements of the apparatus when the apparatus is in its operating, as opposed to collapsed position.

SUMMARY AND OBJECTS OF THE INVENTION

In view of the foregoing limitations and shortcomings of the prior art devices, as well as other disadvantages not specifically mentioned above, it should be apparent that there still exists a need in the art for a climbing stand which is safe and simple to use, both during and after placement on the tree, pole or the like, and during the removal therefrom. It is, therefore, a primary objective of this invention to fulfill this need by providing a simple, reliable climbing stand comprised of two frame members which surround the tree, pole, etc. These frame members include platforms upon which the user can either sit or stand while facing the tree, pole, etc., and can receive continual support from the rear.

More particularly, it is an object of this invention to provide a climbing stand comprised of an upper frame member and a lower frame member. The upper frame member includes a gripping means to engage the side of the tree or pole opposite the user and further includes a slidable platform which is spaced from the tree to accommodate the body of the user in a sitting position.

Another object of the present invention is to provide a tree climbing stand which includes cleats which can be easily removed or re-attached at the discretion of the user.

Still another object of the present invention is to provide a tree climbing stand which includes a safety bar for supporting the user when he is in either a climbing or hunting position.

A further object of the present invention is to provide a tree climbing stand capable of collapsing for ease in transport and storage, and including means for quickly and automatically locking the device when it is in its expanded mode, thereby allowing fast and safe operation.

These and other objects and advantages of the present invention will become apparent by reference to the more detailed description which follows, as well as to the appended claims and the several views illustrated in the drawings.

BRIEF DESCRIPTION OF THE DRAWINGS

FIG. 4 is an enlarged perspective view of the removable cleat mechanism of the present invention;

FIG. 5 illustrates the step of lifting the lower frame member along the height of a tree in operating the present invention;

FIG. 6 illustrates the present invention in its fully operating condition for use by the hunter with the movable seat having been slid to a position adjacent to the tree; and FIG. 7 is a front view of the seat of the present invention.

DETAILED DESCRIPTION OF A PREFERRED EMBODIMENT

Figure 1:
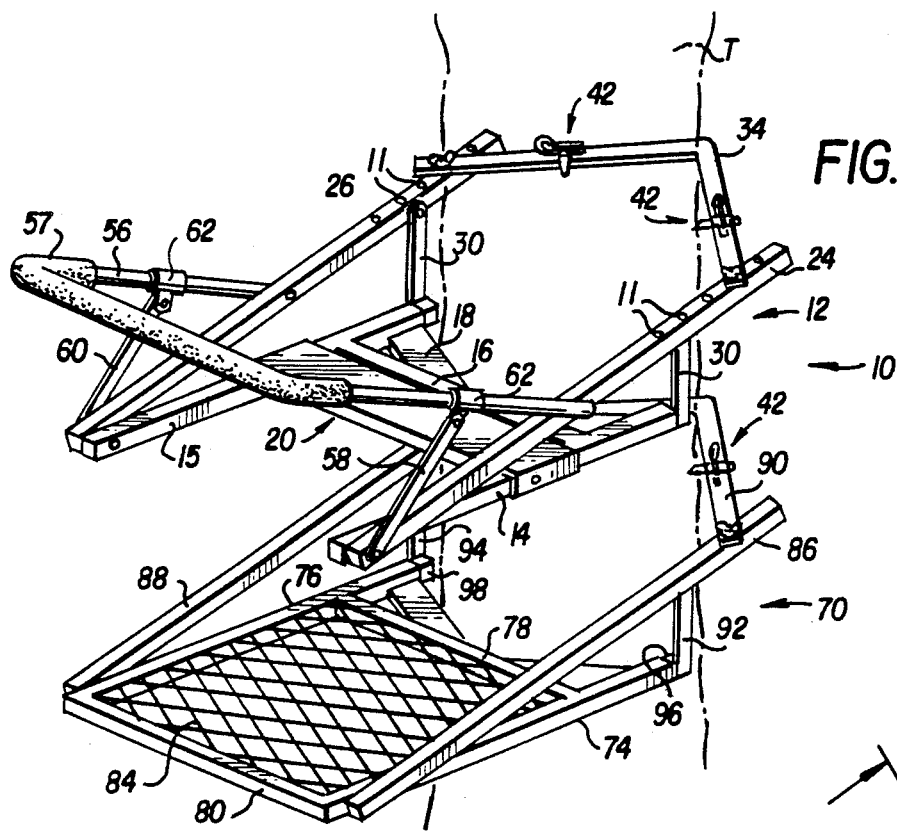
FIG. 1 is a perspective view of a preferred embodiment of the tree climbing stand of the present invention in its expanded, operating mode.

Referring more specifically to the drawings wherein like numerals indicate like elements throughout the several views, there is illustrated in FIG. 1 of the drawings a preferred embodiment of the tree climbing stand apparatus of the present invention designated generally by reference numeral 10.

Referring now in particular to FIG. 1, stand apparatus 10 includes an upper frame member generally designated by reference numeral 12. Upper climbing element 12 is characterized by a pair of generaly parallel spaced side bars 14,15, preferably formed of steel or aluminum hollow square tubing. Side bars 14,15 are spaced by a fixed cross bar 16, having a length sufficient to allow tree trunks to fit between side bars 14,15. A lower gripping wedge 18 is mounted between side bars 14,15 for engagement with the tree or column. A seat 20 is slidably mounted between side bars 14,15 such that the seat can slide back and forth as indicated by arrow A in FIG. 2. As best seen in FIG. 7, seat 20 preferably comprises a platform 22 which is mounted at each end to a pair of rectangular sleeves 23 which surround side bars 14,15 such that seat 20 is captured by the side bars. In addition to supporting the user as shown in FIGS. 5 and 6, seat 20 functions as a structural support for side bars 14,15. The inclusion of this additional support allows the elimination of a second fixed cross bar (designated 32 in the '216 patent) which was found to be uncomfortable to the user.

A pair of generally parallel diagonal bars 24 and 26 are hingedly mounted to the ends of side bars 14 and 15 respectively opposite the tree or upright column member T.

An upper gripping wedge 34 is removably mounted to the ends of side bars 24,26 for engagement with the back side of the tree as shown in FIG. 1. Removable mounting may be accomplished by means of conventional bolt and wing-nut assemblies which extend through apertures in the wedge. A plurality of apertures 11 are provided in diagonal bars 24,26 to allow the distance between lower gripping wedge 18 and upper gripping wedge 34 to vary depending on the width of tree T.

A pair of removable cleat assemblies, designated generally by reference numeral 42 mounted in spaced relation to each other on gripping wedge 34 for engaging tree T. As seen in FIG. 4, cleat assembly 42 comprises a tubular housing 44 mounted as by welding, to gripping wedge 34. A cleat 46 may be removably received in the tubular housing. The tubular housing is provided with a pair of opposed apertures 49 formed in the side walls of the housing. A removable pin 48 is adapted to engage the apertures 49 and an aperture (not shown) in cleat 46 whereby the cleat is removably retained. Easy removal of the cleat is provided to enable the tree stand to be used in jurisdictions which prohibit cleats or similar toothed elements which pierce the bark of trees.

Figure 2:
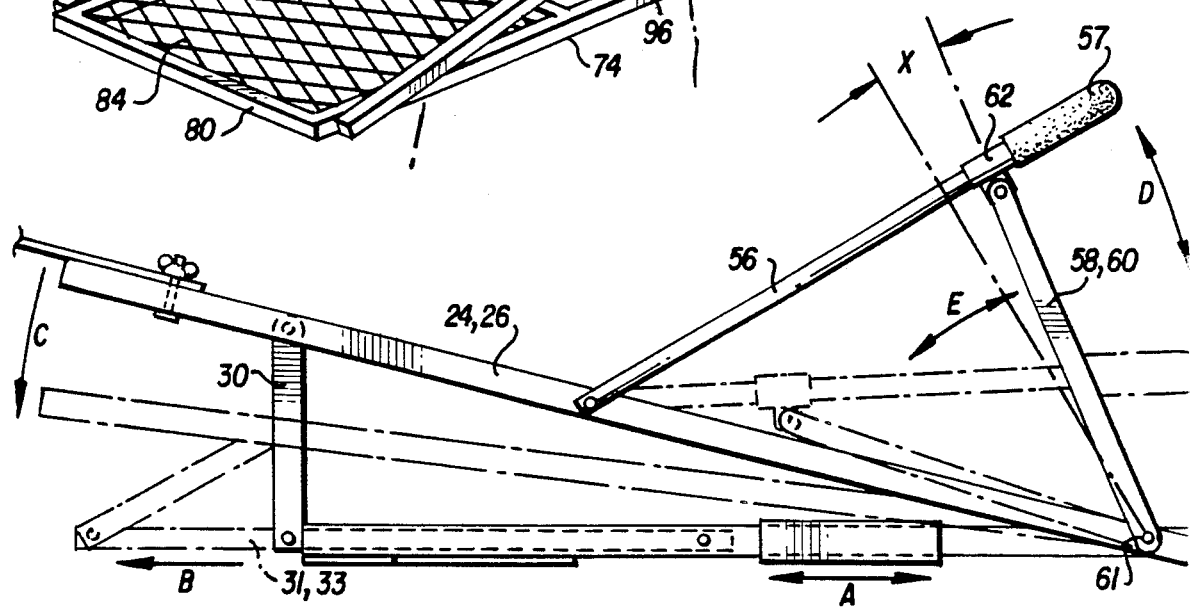
FIG. 2 is a side view of the upper frame member of the embodiment illustrated in FIG. 1.

A pair of struts 28,30 are pivotably mounted at one end to diagonal bars 24,26 and at their opposite end to a pair of telescoping bars 31,33 (FIG. 2). The telescoping bars are positioned within and in slidable engagement with hollow side bars 14,15.

The arrangement of pivoting diagonal bars 24,26, struts 28,30, and telescoping bars 31,33 function together to allow the climbing element 12 to collapse as shown by the arrows B and C in FIG. 2 to permit ease in transport and storage.

When struts 28,30 are generally perpendicular in relation to side bars 14,16 as illustrated by the solid lines in FIG. 2, climbing element 12 is in its expanded, operational mode. As mentioned, a key disadvantage of the prior art is the fact that the collapsible frame members frequently loose their rigid form during the climbing operation. To remedy this problem, a locking means is provided to retain telescoping bars 31,33 within hollow side bars 14,15 thereby locking the frame members in their expanded, operational mode.

Figure 3:
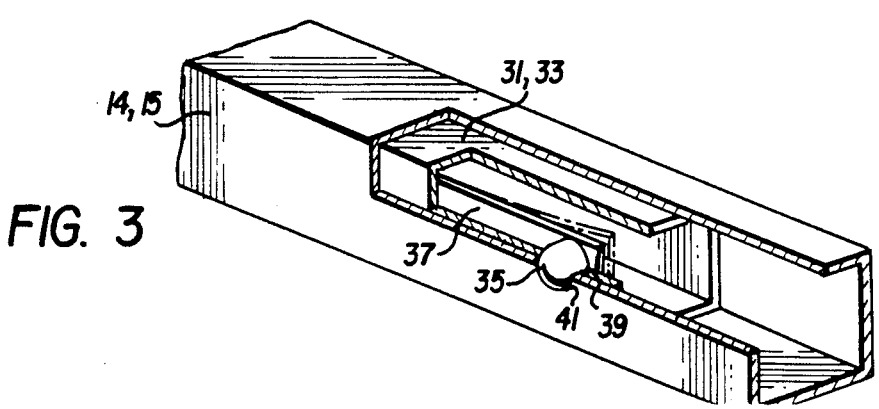
FIG. 3 is an enlarged perspective view partially in section of the locking mechanism of the present invention.

With reference to FIG. 3, this locking means preferably includes a flat spring 37 which is mounted at its first end to the inside of telescoping bars 31,33. At the second end of the flat spring is mounted a pin 35. The pin is biased into engagement with apertures 39 in the telescoping bar and aperture 41 in the side bar when the two apertures correspond with each other as shown in FIG. 3.

A U-shaped safety bar 56 is hingedly mounted to diagonal bars 24,26 to provide support for the back of the climber as shown in FIG. 5. Safety bar 56 is preferably constructed of aluminum tubing or the like. Pading 57 constructed of foam rubber is provided. A pair of struts 58,60 are hingedly mounted at one end to bolt 61 and hingedly mounted at the opposite end to a collar 62 (FIG. 7). The collar is slidably engaged with safety bar 56.

In addition to supporting the back of the climber, safety bar 56 functions as a means for supporting rifles and the like during hunting (FIG. 6).

The struts 58,60 and collar 62 function together to allow safety bar 56 to move from an upright position to a collapsed position as shown by arrows D and E in FIG. 2.

As will be understood by those familiar with the art, when collar 62 is within area X, downward pressure on the safety bar will not cause it to collapse. Accordingly, no locking means is required to retain the safety bar 46 in its upright position.

Stand apparatus 10 also includes a lower climbing element generally designated by reference numeral 70. This lower frame member is substantially similar to upper frame member 12 except for the absence of seat 20 and safety bar 56 in the lower frame member 70.

Lower frame member 70 preferably comprises a pair of generaly parallel spaced side bars 74,76 spaced by a plurality of fixed cross bars 78,80. A platform 84, constructed of metal mesh or the like, is mounted between side bars 74,76 to accommodate the feet of the hunter or other user while in a standing, climbing, or sitting position.

A pair of generally parallel diagonal bars 86 and 88 are hingedly mounted to the ends of side bars 74 and 76 respectively.

An upper gripping wedge 90 is removably mounted to the ends of side bars 86 and 88. A pair of removable cleat assemblies 42 are provided on wedge 90. A pair of struts 92 and 94 are pivotably mounted at one end to diagonal bars 86,88 and at their opposite end to a pair of telescoping bars 96 and 98. The arrangement of pivoting diagonal bars, struts, and telescoping bars functions as described above.

The use and operation of the present invention is substantially as described in columns 5 through 7 of the '216 patent.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. Apparatus for climbing a generally vertical member comprising:
   an upper climbing element for accommodating the body of a climber, said upper climbing element comprising a generally rectangular frame including a first pair of tubular side members, a second pair of tubular side members mounted to said first pair of side members by hinged means, a pair of struts mounted to said side members by hinged means, and means provided at one end of said frame for gripping said vertical member; and
   said upper climbing member further including a generally U-shaped member mounted to said rectangular frame by hinged means, and including additional hinged means for mounting to said pair of struts;
   whereby said generally U-shaped member serves as a back support when the climber is facing the vertical member and as a forward support structure when the climber is facing away from the vertical member.

2. The apparatus of claim 1 further comprising: means provided on said gripping means for removably receiving a cleat for engagement with said vertical member.

3. The apparatus of claim 2, wherein said means for removably receiving a cleat comprises a tubular housing for receiving said cleat and locking means for retaining said cleat within said housing.

4. The apparatus of claim 3, wherein said locking means comprises a removable pin.

5. The apparatus of claim 4, wherein said cleat is provided with an aperture, said tubular housing is provided with a pair of opposed apertures formed in side walls of said tubular housing, and one leg of said removable pin is adapted to engage said aperture in said cleat and said opposed apertures in said tubular housing, whereby said cleat is removably retained in said tubular housing by said removable pin.

6. The apparatus of claim 5, wherein said gripping means is a wedge shaped bar having a pair of angularly disposed legs, and one of said means for removably receiving a cleat is provided on each of the legs of said bar.

7. The apparatus of claim 6, wherein said apparatus includes the upper, body-supporting section of a tree climbing stand.

8. The apparatus of claim 6, wherein said apparatus includes lower, foot-supporting section of a tree climbing stand.

9. The apparatus according to claim 1, further including means for supporting said U-shaped member, said support means comprising said pair of struts, said struts being hingedly mounted at one end to said side members and slidably mounted at the opposite end by a sliding means to said U-shaped element.

10. The apparatus of claim 1, wherein said generally rectangular frame further comprises:
a pair of telescoping members received within said first pair of side members, and
a pair of struts intermediate and hingedly mounted to said first and second pairs of side members, such that said apparatus may exist in a collapsed or expanded state; and
means provided on said first pair of side members and said telescoping members for locking said apparatus in said expanded state.

11. Apparatus according to claim 10, wherein said locking means includes a spring-biased pin which extends through apertures formed in said pair of first side members and telescoping members.

12. Apparatus according to claim 1, further including collar means associated with said hinged means for mounting said U-shaped member to said pair of struts wherein said U-shaped member is slideably engaged within said collar means.

13. The apparatus according to claim 1 further comprising:
a lower climbing element for accommodating the feet of said climber, said lower climbing element comprising a generally rectangular frame including a pair of side members, and means provided at one end of said frame for gripping said vertical member.

14. Apparatus for engaging a generally vertical member for supporting a person above the ground, comprising:
a generally rectangular frame, including at least a first pair of tubular side members each having an outer peripheral surface and a predetermined length;
means provided at one end of said frame for gripping said vertical member; and
a seat provided with means for slideably mounting said seat on said side members, said seat mounting means including a pair of members each of which substantially encircles the outer peripheral surface of said side members along a portion of the length thereof, wherein said seat is captured by said side members.

15. The apparatus of claim 14, wherein said means for slideably mounted said seat comprises a pair of generally rectangular sleeves adapted to slidably engage said side members wherein said seat is mounted to said sleeves.

16. The apparatus according to claim 14, further comprising means provided on said gripping means for removably receiving a cleat for engagement with said vertical member.

17. The apparatus of claim 16 wherein said means for removably receiving a cleat comprises a tubular housing for receiving said cleat and locking means for retaining said cleat within said housing.

18. The apparatus of claim 17, wherein said locking means comprises a removable pin.

19. The apparatus of claim 18, wherein said cleat is provided with an aperture, said tubular housing is provided with a pair of opposed apertures formed in side walls of said tubular housing, and one leg of said removable pin is adapted to engage said aperture in said cleat and said opposed apertures in said tubular housing, whereby said cleat is removably retained in said tubular housing by said removable pin.

20. The apparatus of claim 19, wherein said gripping means is a wedge shaped bar having a pair of angularly disposed legs, and one of said means for removably receiving a cleat is provided on each of the legs of said bar.

21. The apparatus of claim 20, wherein said apparatus is an upper, body-supporting section of a tree climbing stand.

22. The apparatus of claim 20, wherein said apparatus includes a lower, foot supporting section of a tree climbing stand.

23. The apparatus of claim 14 wherein said generally rectangular frame further comprises a second pair of tubular side members mounted to said first pair of side members by hinged means, a pair of telescoping members received within said first pair of side members, and a pair of struts intermediate and hingedly mounted by hinge means to said first and second pairs of side members, such that said apparatus may exist in a collapsed or expanded state; and
means provided on said first pair of side members and said telescoping members for locking said apparatus in said expanded state.

24. The apparatus according to claim 23, wherein said locking means includes a spring-biased pin which extends through apertures formed in said first pair of side members and telescoping members.

* * * * *